(12) United States Patent
Qian et al.

(10) Patent No.: US 11,841,883 B2
(45) Date of Patent: Dec. 12, 2023

(54) RESOLVING QUERIES USING STRUCTURED AND UNSTRUCTURED DATA

(71) Applicant: International Business Machines Corporation, Armonk, NY (US)

(72) Inventors: Kun Qian, San Jose, CA (US); Yunyao Li, San Jose, CA (US); Nikita Bhutani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 16/559,351

(22) Filed: Sep. 3, 2019

(65) Prior Publication Data

US 2021/0064642 A1 Mar. 4, 2021

(51) Int. Cl.
*G06F 16/332* (2019.01)
*G06F 16/33* (2019.01)

(52) U.S. Cl.
CPC ...... *G06F 16/3329* (2019.01); *G06F 16/3344* (2019.01)

(58) Field of Classification Search
CPC .................................................. G06F 16/3329
See application file for complete search history.

(56) References Cited

U.S. PATENT DOCUMENTS

| | | | |
|---|---|---|---|
| 2003/0212666 A1 | 11/2003 | Basu et al. | |
| 2007/0073533 A1 | 3/2007 | Thione et al. | |
| 2012/0036145 A1* | 2/2012 | Tunstall-Pedoe | G06F 16/24534 707/E17.015 |
| 2012/0078888 A1 | 3/2012 | Brown et al. | |
| 2014/0358890 A1* | 12/2014 | Chen | G06F 16/9535 707/710 |
| 2015/0331850 A1 | 11/2015 | Ramish | |
| 2016/0042058 A1 | 2/2016 | Nguyen | |
| 2016/0132572 A1 | 5/2016 | Chang et al. | |
| 2016/0275180 A1 | 9/2016 | Matskevich | |
| 2016/0306791 A1* | 10/2016 | Allen | G06F 16/3329 |
| 2017/0213545 A1* | 7/2017 | Kwon | G10L 15/1815 |
| 2018/0011927 A1 | 1/2018 | Lee et al. | |
| 2020/0065422 A1* | 2/2020 | Yan | G06N 3/082 |
| 2020/0074316 A1* | 3/2020 | Ma | G06F 16/9024 |

(Continued)

FOREIGN PATENT DOCUMENTS

| | | |
|---|---|---|
| CN | 101436192 A | 5/2009 |
| CN | 104216913 A | 12/2014 |
| CN | 102708129 B | 4/2017 |

(Continued)

OTHER PUBLICATIONS

International Search Report and Written Opinion from PCT Application No. PCT/IB2020/057852, dated Dec. 1, 2020.

(Continued)

*Primary Examiner* — Van H Oberly
(74) *Attorney, Agent, or Firm* — Zilka-Kotab, P.C.

(57) ABSTRACT

A computer-implemented method according to one embodiment includes receiving a question in a natural language format; deriving a plurality of subqueries from the question; determining that a first subquery of the plurality of subqueries cannot be resolved utilizing a curated knowledge base; resolving the first subquery, utilizing unstructured text; and adjusting the curated knowledge base, utilizing the resolved first subquery.

27 Claims, 5 Drawing Sheets

(56) References Cited

U.S. PATENT DOCUMENTS

2021/0182709 A1* 6/2021 Manchanda .......... G06N 5/022

FOREIGN PATENT DOCUMENTS

| CN | 106649394 A | 5/2017 |
|---|---|---|
| CN | 107016012 A | 8/2017 |
| CN | 107967285 A | 4/2018 |

OTHER PUBLICATIONS

Fader et al., "Open Question Answering Over Curated and Extracted Knowledge Bases," ACM, KDD '14, Aug. 24-27, 2014, pp. 1156-1165.

Hoffart et al., "The Knowledge Awakens: Keeping Knowledge Bases Fresh with Emerging Entities," ACM, WWW 16 Companion, Apr. 11-15, 2016, pp. 203-206.

Liu et al., "Representing Documents via Latent Keyphrase Inference," International World Wide Web Conference Committee, WWW '16, Apr. 11-15, 2016, pp. 1057-1067.

Loster et al., "CurEx—A System for Extracting, Curating, and Exploring Domain-Specific Knowledge Graphs from Text," ACM, Proceedings of The 27th ACM International Conference on Information and Knowledge Management (CIKM'18), Oct. 22-26, 2018, pp. 1883-1886.

Stanford, "SEMPRE: Semantic Parsing with Execution," Stanford, 3 pages, retrieved on Aug. 23, 2019 from https://nlp.stanford.edu/software/sempre/.

Saha et al., "Athena: An Ontology-Driven System for Natural Language Querying over Relational Data Stores," Proceedings of the VLDB Endowment, vol. 9, No. 12, 2016, pp. 1209-1220.

Yahya et al., "Exploratory Querying of Extended Knowledge Graphs," Proceedings of the VLDB Endowment, vol. 9, No. 13, 2016, pp. 1521-1524.

Yahya et al., "Deep Answers for Naturally Asked Questions on the Web of Data," WWW 2012 Companion, ACM, Apr. 2012, pp. 445-448.

Withdrawal Letter from European Application No. GB2203699.0, dated Dec. 16, 2022.

Examination Report from European Application No. GB2203699.0, dated Nov. 1, 2022.

* cited by examiner

RESOLVING QUERIES USING STRUCTURED AND UNSTRUCTURED DATA

BACKGROUND

The present invention relates to data analysis, and more specifically, this invention relates to resolving queries utilizing a combination of indexed unstructured data and a curated knowledge base.

Knowledge bases (KBs) are frequently used within many data-centric applications, such as question answering (QA) applications. Such knowledge bases are created utilizing curated unstructured text, and provide accurate answers based on high-precision knowledge. However, while knowledge bases provide accurate results for a specific subset of information, they are unable to provide answers to queries outside that specific subset.

SUMMARY

A computer-implemented method according to one embodiment includes receiving a question in a natural language format; deriving a plurality of subqueries from the question; determining that a first subquery of the plurality of subqueries cannot be resolved utilizing a curated knowledge base; resolving the first subquery, utilizing unstructured text; and adjusting the curated knowledge base, utilizing the resolved first subquery.

According to another embodiment, a computer program product for resolving queries using structured and unstructured data includes a computer readable storage medium having program instructions embodied therewith, where the computer readable storage medium is not a transitory signal per se, and where the program instructions are executable by a processor to cause the processor to perform a method including receiving, by the processor, a question in a natural language format; deriving, by the processor, a plurality of subqueries from the question; determining, by the processor, that a first subquery of the plurality of subqueries cannot be resolved utilizing a curated knowledge base; resolving, by the processor, the first subquery, utilizing unstructured text; and adjusting, by the processor, the curated knowledge base, utilizing the resolved first subquery.

According to another embodiment, a system includes a processor; and logic integrated with the processor, executable by the processor, or integrated with and executable by the processor, where the logic is configured to receive a question in a natural language format; derive a plurality of subqueries from the question; determine that a first subquery of the plurality of subqueries cannot be resolved utilizing a curated knowledge base; resolve the first subquery, utilizing unstructured text; and adjust the curated knowledge base, utilizing the resolved first subquery.

According to another embodiment, a computer-implemented method includes receiving a question in a natural language format; deriving a first subquery and a second subquery from the question; determining that the first subquery cannot be resolved utilizing a curated knowledge base based on unstructured text; creating additional search terms for the first subquery, utilizing query relaxation; querying a search index for the unstructured text, utilizing the first subquery and the additional search terms; receiving search results in response to the querying of the search index; creating new subject/predicate/object triples, based on the search results; completing the first subquery, utilizing the new subject/predicate/object triples; updating the curated knowledge base to include the completed first subquery; determining that the second subquery can be resolved utilizing the updated curated knowledge base; and completing the second subquery, utilizing the updated curated knowledge base.

According to another embodiment, a computer program product for implementing on-demand extraction and integration includes a computer readable storage medium having program instructions embodied therewith, where the computer readable storage medium is not a transitory signal per se, and where the program instructions are executable by a processor to cause the processor to perform a method including receiving, by the processor, a question in a natural language format; deriving, by the processor, a first subquery and a second subquery from the question; determining, by the processor, that the first subquery cannot be resolved utilizing a curated knowledge base based on unstructured text; creating, by the processor, additional search terms for the first subquery, utilizing query relaxation; querying, by the processor, a search index for the unstructured text, utilizing the first subquery and the additional search terms; receiving, by the processor, search results in response to the querying of the search index; creating, by the processor, new subject/predicate/object triples, based on the search results; completing, by the processor, the first subquery, utilizing the new subject/predicate/object triples; updating, by the processor, the curated knowledge base to include the completed first subquery; determining, by the processor, that the second subquery can be resolved utilizing the updated curated knowledge base; and completing, by the processor, the second subquery, utilizing the updated curated knowledge base.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for resolving queries using structured and unstructured data.

In one general embodiment, a computer-implemented method includes receiving a question in a natural language format; deriving a plurality of subqueries from the question; determining that a first subquery of the plurality of subqueries cannot be resolved utilizing a curated knowledge base; resolving the first subquery, utilizing unstructured text; and adjusting the curated knowledge base, utilizing the resolved first subquery.

In another general embodiment, a computer program product for resolving queries using structured and unstructured data includes a computer readable storage medium having program instructions embodied therewith, where the computer readable storage medium is not a transitory signal per se, and where the program instructions are executable by a processor to cause the processor to perform a method including receiving, by the processor, a question in a natural language format; deriving, by the processor, a plurality of subqueries from the question; determining, by the processor, that a first subquery of the plurality of subqueries cannot be resolved utilizing a curated knowledge base; resolving, by the processor, the first subquery, utilizing unstructured text; and adjusting, by the processor, the curated knowledge base, utilizing the resolved first subquery.

In another general embodiment, a system includes a processor; and logic integrated with the processor, executable by the processor, or integrated with and executable by the processor, where the logic is configured to receive a question in a natural language format; derive a plurality of subqueries from the question; determine that a first subquery of the plurality of subqueries cannot be resolved utilizing a curated knowledge base; resolve the first subquery, utilizing unstructured text; and adjust the curated knowledge base, utilizing the resolved first subquery.

In another general embodiment, a computer-implemented method includes receiving a question in a natural language format; deriving a first subquery and a second subquery from the question; determining that the first subquery cannot be resolved utilizing a curated knowledge base based on unstructured text; creating additional search terms for the first subquery, utilizing query relaxation; querying a search index for the unstructured text, utilizing the first subquery and the additional search terms; receiving search results in response to the querying of the search index; creating new subject/predicate/object triples, based on the search results; completing the first subquery, utilizing the new subject/predicate/object triples; updating the curated knowledge base to include the completed first subquery; determining that the second subquery can be resolved utilizing the updated curated knowledge base; and completing the second subquery, utilizing the updated curated knowledge base.

In another general embodiment, a computer program product for implementing on-demand extraction and integration includes a computer readable storage medium having program instructions embodied therewith, where the computer readable storage medium is not a transitory signal per se, and where the program instructions are executable by a processor to cause the processor to perform a method including receiving, by the processor, a question in a natural language format; deriving, by the processor, a first subquery and a second subquery from the question; determining, by the processor, that the first subquery cannot be resolved utilizing a curated knowledge base based on unstructured text; creating, by the processor, additional search terms for the first subquery, utilizing query relaxation; querying, by the processor, a search index for the unstructured text, utilizing the first subquery and the additional search terms; receiving, by the processor, search results in response to the querying of the search index; creating, by the processor, new subject/predicate/object triples, based on the search results; completing, by the processor, the first subquery, utilizing the new subject/predicate/object triples; updating, by the processor, the curated knowledge base to include the completed first subquery; determining, by the processor, that the second subquery can be resolved utilizing the updated curated knowledge base; and completing, by the processor, the second subquery, utilizing the updated curated knowledge base.

Figure 1:
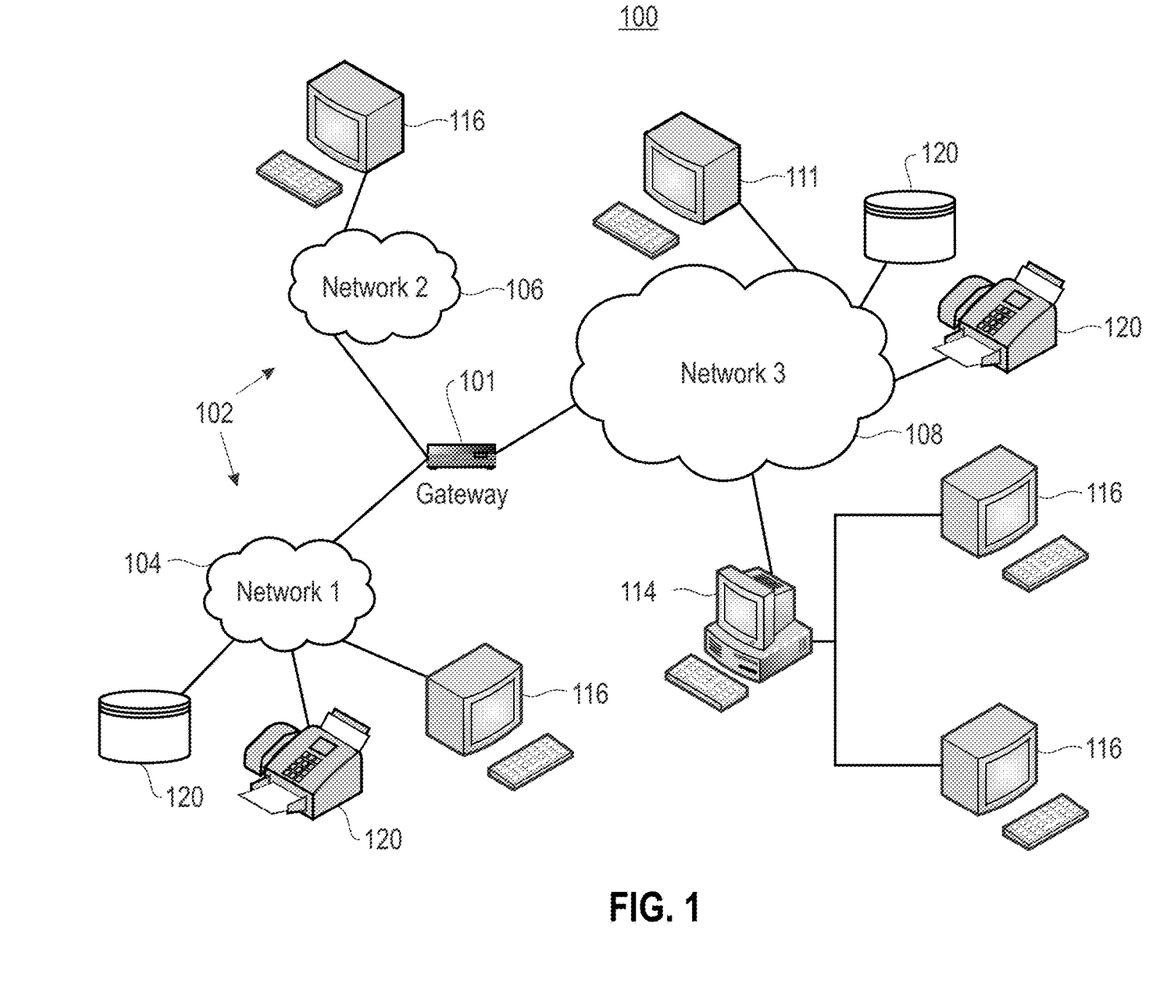
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
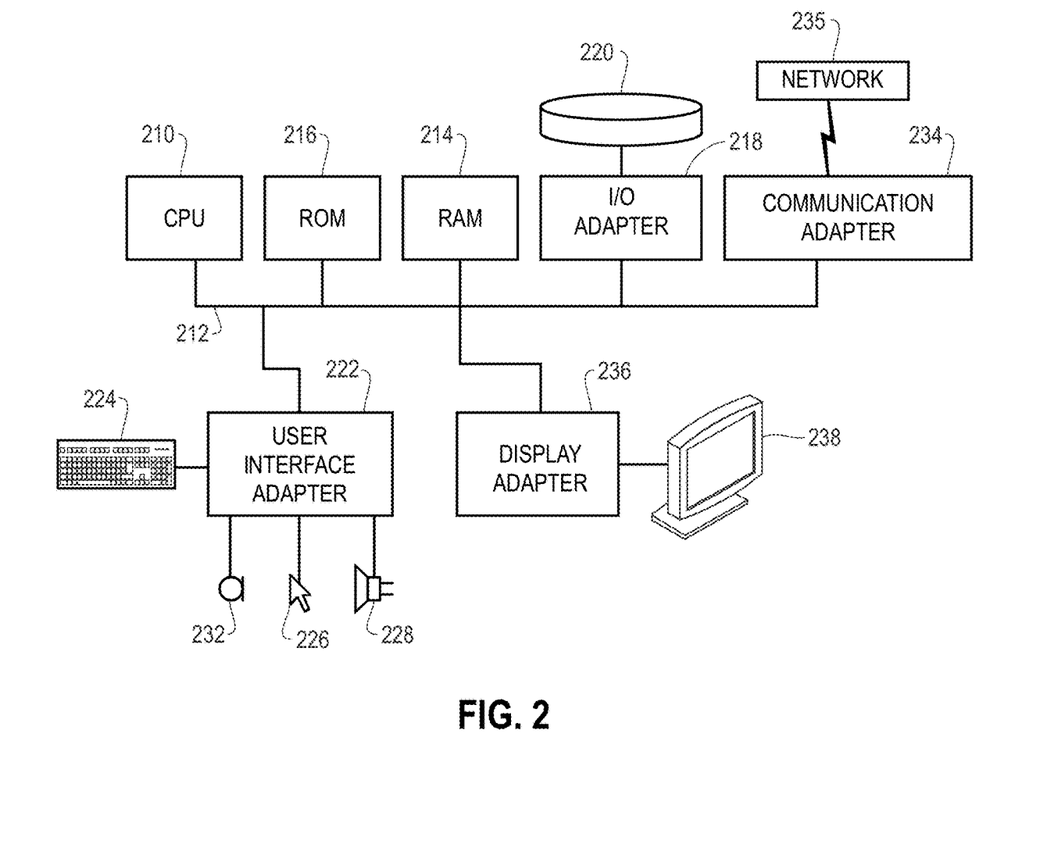
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
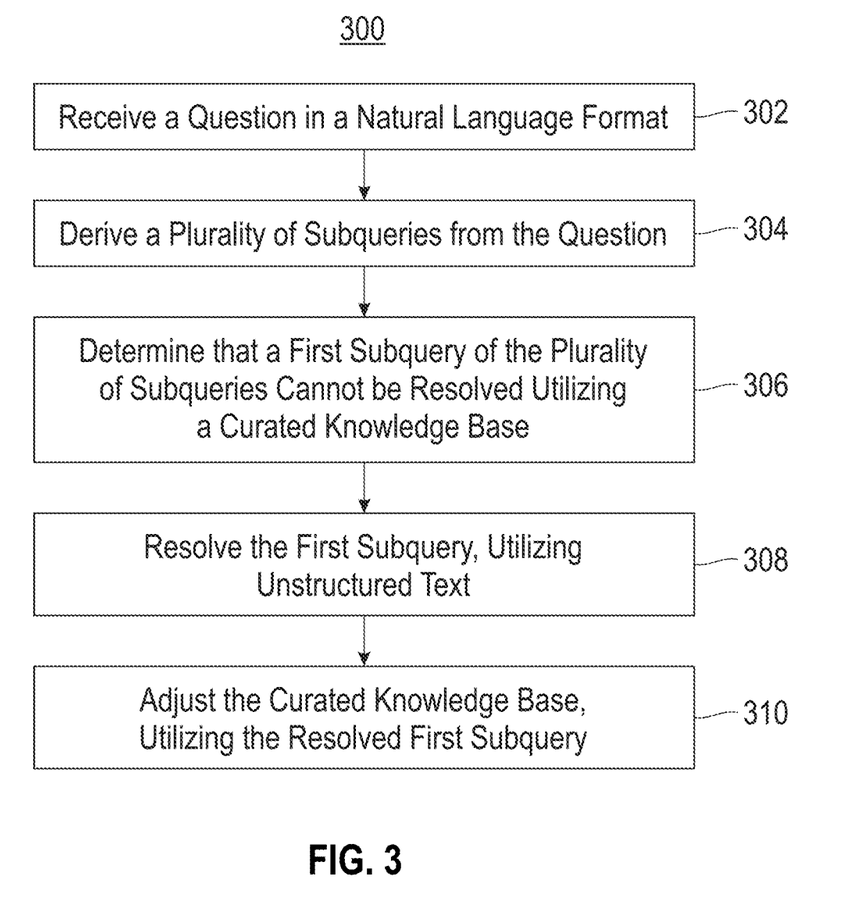
FIG. 3 illustrates a method for resolving queries using structured and unstructured data, in accordance with one embodiment of the present invention.

Now referring to FIG. 3, a flowchart of a method 300 is shown according to one embodiment. The method 300 may be performed in accordance with the present invention in any of the environments depicted in FIGS. 1-2 and 5, among others, in various embodiments. Of course, greater or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a question is received in a natural language format. In one embodiment, the question may be received by a question answering (QA) application. In another embodiment, the question may include a query to be answered by the QA application. In yet another embodiment, the natural language format may include a format used in everyday speech by humans.

Additionally, in one embodiment, the natural language format may be distinguished from formal languages using program code, etc. In another embodiment, an exemplary question in a natural language format may include the question "what is the revenue of the competitors of company X in 2018?".

Further, method 300 may proceed with operation 304, where a plurality of subqueries is derived from the question. In one embodiment, the subqueries may be derived from the question by parsing the natural language format of the question into logical form. For example, the question may be parsed to identify one or more components of the question. In another example, the one or more components may be analyzed to create one or more subqueries from the question.

Further still, in one embodiment, each subquery may include an incomplete n-ary tuple such as a triple (e.g., a subject/predicate/object triple, etc.). For example, the incomplete triple may be missing data for one or more of the fields of subject, predicate, and object. In another embodiment, a subject/predicate/object triple may include a data object containing fields for a subject, a predicate, and an object that are filled based on the results of parsing the question. For example, for the question "what is the revenue of the competitors of company X in 2018?", the derived subject/predicate/object triples may include the following incomplete triples: a first subquery (?y, "revenue of", ?x) and a second subquery (?x, "competitors of", "company X").

Also, method 300 may proceed with operation 306, where it is determined that a first subquery of the plurality of subqueries cannot be resolved utilizing a curated knowledge base. In one embodiment, the curated knowledge base may include data conforming to a predetermined domain that is gathered from unstructured text. For example, unstructured text (e.g., free text, etc.) may be parsed (manually and/or automatically) to determine textual data (e.g., words, sentences, etc.) that match a predetermined domain. In another embodiment, the curated knowledge base may include a plurality of complete triples.

In addition, in one example, the predetermined domain may have one or more predetermined topics (e.g., finance information for companies, etc.) for the curated knowledge base. In another example, the textual data that matches the predetermined domain may be added to the curated knowledge base for the predetermined domain. In yet another example, the curated knowledge base may include a plurality of complete triples.

Furthermore, in one embodiment, the first subquery of the plurality of subqueries may not be able to be resolved by the QA application utilizing the curated knowledge base. For example, the first subquery of the plurality of subqueries may include incomplete triples that cannot be completed by comparing the incomplete triples to the curated knowledge base. In another embodiment, a second subquery of the plurality of subqueries may be able to be resolved by the QA application utilizing the curated knowledge base. For example, the second subquery of the plurality of subqueries may include incomplete triples that can be completed by comparing the incomplete triples to the curated knowledge base. In another embodiment, the first subquery may be determined to be unable to be resolved utilizing the curated knowledge base based on an analysis of a semantic relevance of the first subquery to the curated knowledge base.

Further still, method 300 may proceed with operation 308, where the first subquery is resolved, utilizing unstructured text. In one embodiment, the unstructured text may include the textual corpus from which the curated knowledge base was created. In another embodiment, the unstructured text may include historical textual documents (e.g., text files, HTML, etc.) having no predetermined structure. In yet another embodiment, the first subquery may include an incomplete triple. In one embodiment, the first subquery may be resolved utilizing unstructured text in response to determining that the first subquery cannot be resolved utilizing a curated knowledge base.

Also, in one embodiment, resolving the first subquery may include querying a search index previously created utilizing the unstructured text. For example, the unstructured text may be pre-processed (e.g., parsed, analyzed, etc.) to create the search index. In another example, the search index may include a keyword-based search engine created for the unstructured text. In yet another example, the search index may include a keyword-based search engine created for the unstructured text. For instance, the search index may be searched, utilizing terms found within the incomplete triple of the first subquery.

Additionally, in one embodiment, query relaxation may be used to create additional terms to include in the search index query. For example, performing query relaxation may include determining similar terms (e.g., synonyms, etc.) for terms within the incomplete triple of the first subquery. In another example, the search index query may be amended to include these similar terms may be as well as the terms of the incomplete triple.

Further, in one embodiment, resolving the first subquery may include receiving results of querying the search index. For example, the results may include one or more text snippets determined to be of interest. In another example, each of the one or more text snippets may include one or more portions of text (e.g., words, phrases, sentences, paragraphs, etc.) that match the search index query. In yet another example, the one or more text snippets may be ranked according to one or more criteria (e.g., relevance to the search index query, etc.).

Further still, in one embodiment, resolving the first subquery may include creating new triples, utilizing the results of querying the search index. For example, new subject/predicate/object triples may be created utilizing the one or more text snippets received as search index query results. In another example, these new triples may be complete (e.g., they may have values for the subject, predicate, and object fields).

Also, in one embodiment, resolving the first subquery may include completing the first subquery, utilizing the new triples. For example, the first subquery may include an incomplete triple. In another example, the incomplete triple of the first subquery may be completed, based on a comparison to the new triples. In yet another example, one or more alignment-based answer identification and similarity operations may be performed on the incomplete triple of the first subquery, based on the new triples, in order to determine a value for the missing field or fields for the incomplete triple. In still another example, the value for the missing field or fields of the incomplete triple may be added to the incomplete triple to create a complete triple of the first subquery.

Also, in one embodiment, the unstructured data may be periodically updated to include information previously searched for but not found within the unstructured data. For example, if an amount of text snippets returned in response to querying the search index falls below a predetermined threshold, a search may be made for additional unstructured data that includes results determined to be more relevant to the search index query. This additional unstructured data may be merged with the current unstructured data to enhance the corpus of unstructured data.

In addition, method 300 may proceed with operation 310, where the curated knowledge base is adjusted, utilizing the resolved first subquery. In one embodiment, adjusting the curated knowledge base may include adding the resolved first subquery to the curated knowledge base. In another embodiment, the resolved first subquery may include a completed triple that is added to existing complete triples within the curated knowledge base, based on determined dependencies between the resolved first subquery and existing triples within the curated knowledge base.

Furthermore, in one embodiment, a second subquery of the plurality of subqueries may be resolved utilizing the adjusted curated knowledge base. For example, resolving the second subquery may include completing the second subquery, utilizing the triples within the adjusted curated knowledge base. In another example, the second subquery of the plurality of subqueries may include an incomplete triple that is compared to complete triples within the adjusted curated knowledge base (e.g., including the completed triple of the resolved first subquery).

Further still, in one example, one or more alignment-based answer identification and similarity operations may be performed on the incomplete triple of the second subquery, based on the complete triples within the adjusted curated knowledge base, in order to determine a value for the missing field or fields for the incomplete triple. In another example, the value for the missing field or fields of the incomplete triple of the second subquery may be added to the incomplete triple to create a complete triple (thereby resolving the second subquery).

Also, in one embodiment, the resolved first subquery and the resolved second subquery may be used to create an answer to the received question. For example, the information in the fields of the triples of the resolved first subquery and the resolved second subquery may be transformed into a response having a natural language format. In another example, the response may be returned in the natural language format.

In this way, both unstructured data (the unstructured text) and structured data (the curated knowledge base) may be used together by a QA system to answer questions. Additionally, the curated knowledge base may be dynamically enhanced utilizing results of unstructured text searches and analysis. This may improve a relevance of the curated knowledge base, which may improve an accuracy and performance of future subquery searches performed utilizing the curated knowledge base. By improving a relevance of the curated knowledge base, computing devices utilizing the curated knowledge base may also benefit from improved performance.

Figure 4:
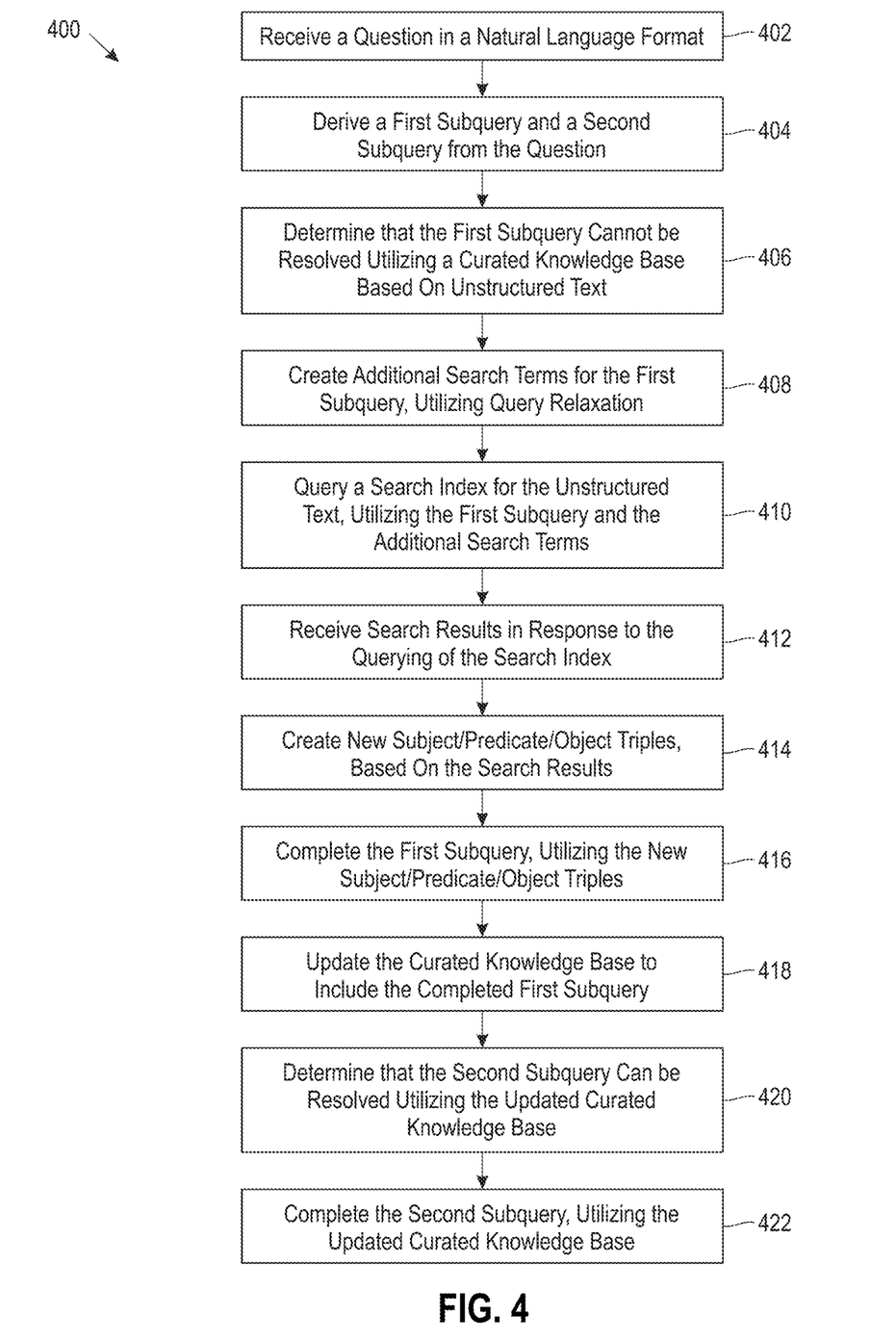
FIG. 4 illustrates a method for implementing on-demand extraction and integration, in accordance with one embodiment of the present invention.

Now referring to FIG. 4, a flowchart of a method 400 for implementing on-demand extraction and integration is shown according to one embodiment. The method 400 may be performed in accordance with the present invention in any of the environments depicted in FIGS. 1-2 and 5, among others, in various embodiments. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a question is received in a natural language format. Additionally, method 400 may proceed with operation 404, where a first subquery and a second subquery are derived from the question. In one embodiment, the first subquery and the second subquery may both include an incomplete subject/predicate/object triple. In another embodiment, the first subquery may be different from the second subquery. For example, the first subquery may have different triple field values when compared to the second subquery.

Additionally, method 400 may proceed with operation 406, where it is determined that the first subquery cannot be resolved utilizing a curated knowledge base based on unstructured text. Further, method 400 may proceed with operation 408, where additional search terms are created for the first subquery, utilizing query relaxation. Further still, method 400 may proceed with operation 410, where a search index for the unstructured text is queried, utilizing the first subquery and the additional search terms. In one embodiment, the search index may be previously created utilizing the unstructured text. In another embodiment, the search index for the unstructured text may be queried in response to determining that the first subquery cannot be resolved utilizing the curated knowledge base.

Also, method 400 may proceed with operation 412, where search results are received in response to the querying of the search index. In addition, method 400 may proceed with operation 414, where new subject/predicate/object triples are created, based on the search results. For example, the search results may include a plurality of relevant snippets, and open information extraction may be used to extract new triples from the snippets. In another example, the new triples may be ranked according to their semantic relevance to the first subquery and the second subquery, and a predetermined number of top-ranked triples may be selected as new triples. Furthermore, method 400 may proceed with operation 416, where the first subquery is completed, utilizing the new subject/predicate/object triples. Further still, method 400 may proceed with operation 418, where the curated knowledge base is updated to include the completed first subquery.

Also, method 400 may proceed with operation 420, where is it determined that the second subquery can be resolved utilizing the updated curated knowledge base. In one embodiment, the second subquery may be postponed until the first subquery is completed. For example, the second subquery may be determined to be dependent on the first subquery, based on an analysis of the incomplete triples of the first subquery and the second subquery. For instance, a missing field of the second subquery may be located within the first subquery, and it may be determined that the missing field may be completed when the first subquery is completed. In another embodiment, the second subquery may be postponed until the first subquery is completed, in response to this determination.

Additionally, method 400 may proceed with operation 422, where the second subquery is completed, utilizing the updated curated knowledge base. In one embodiment, the second subquery may be completed in response to determining that the first subquery has been completed and has been added to the curated knowledge base. In another embodiment, the second subquery may be resolved utilizing subject/predicate/object triples in the updated curated knowledge base, including the completed first subquery triple.

In this way, searches to both the curated knowledge base and the unstructured text may be performed to both enhance the curated knowledge base and correctly answer the received question.

Figure 5:
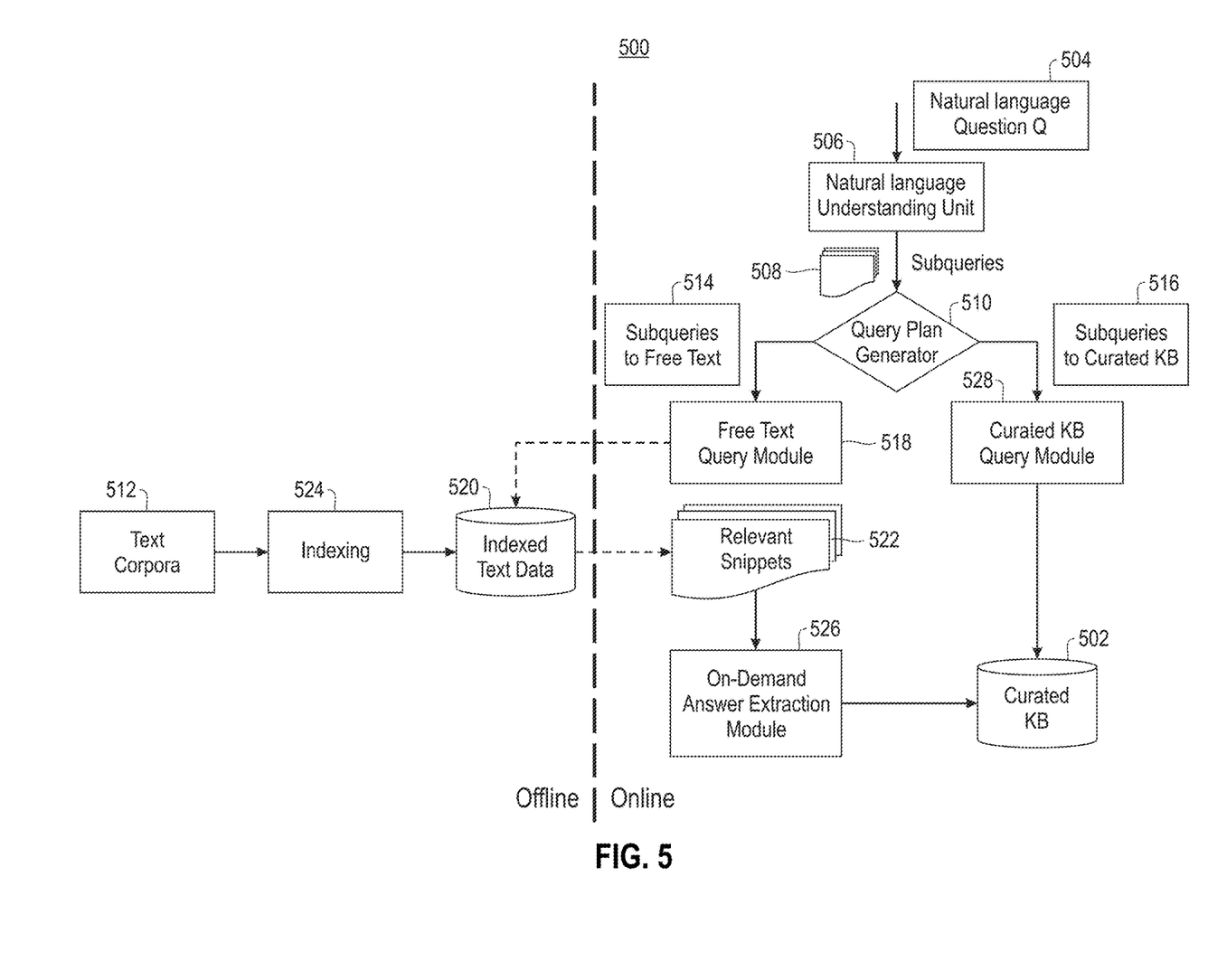
FIG. 5 illustrates an exemplary question answering (QA) system that integrates unstructured and structured data, in accordance with one embodiment of the present invention.

FIG. 5 illustrates an exemplary question answering (QA) system 500 that integrates unstructured and structured data, according to one exemplary embodiment. The QA system 500 answers questions by integrating information from both unstructured data (free text) and structured data (a curated knowledge base 502) in real-time.

As shown, the input to the system is a natural language question Q 504. The question Q 504 is parsed by a natural language understanding unit 506, which converts the question into subqueries 508 that can be understood by a machine. For example, the subqueries 508 may include incomplete subject/predicate/object triples.

Additionally, for each subquery q_x of the subqueries 508, the query plan generator 510 performs query expansion by expanding q_x with a set of similar queries. For example, q_x may include:

(company, acquire, ?).

Query expansion may then be applied to also consider queries such as:

(company, bought, ?), and (?, is bought by, company).

In one embodiment, the above query expansion may be done using one or more paraphrasing models. Then, a combination of string-similarity matching, embedding (e.g., pretrained word2vec embedding) matching, and paraphrasing based matching may be used to determine to which data source (e.g., unstructured text 512 or curated knowledge base 502) each of the subqueries 508 should be sent. Subqueries 508 are divided into two subsets—free text subqueries 514 and curated knowledge base subqueries 516, based on the determined data source.

Further, free text subqueries 514 are sent to a free text query module 518, which searches an indexed text corpus 520 to identify a collection of relevant text snippets 522 that may contain the answers to the free text subqueries 514. The unstructured text 512 is indexed 524 to create the indexed text corpus 520. This is done using indexing techniques (e.g., TF-IDF based methods, etc.) in order to identify and retrieve relevant text snippets 522 quickly. When searching the indexed text corpus 520, the free text subqueries 514 may be expanded using a paraphrasing model to increase coverage.

Further still, the relevant text snippets 522 are passed to an information extractor 526 (such as a relation extractor) to extract candidate answers to each free text subquery 514 (thereby completing each free text subquery 514) and rank them based on their relevance scores.

Also, all or some of the completed free text subqueries 514 are then added to the curated knowledge base 502 to update the curated knowledge base 502. In one embodiment, all or some of the completed free text subqueries 514 may be integrated with completed curated knowledge base subqueries 516 (completed, for example, by a curated knowledge base query module 528 utilizing the curated knowledge base 502) to determine a final answer to be provided in response to the natural language question Q 504. In another embodiment, one or more of the curated knowledge base subqueries 516 may be completed by the curated knowledge base query module 528 utilizing the updated curated knowledge base 502, and the completed knowledge base subqueries 516 may then be used to determine the final answer to be provided in response to the natural language question Q 504.

In another embodiment, one or more aggregations may be performed if there is an aggregation subquery identified from the natural language question Q 504.

On-Demand Extraction and Integration

Knowledge bases (KB) have been at the core of many data-centric applications, such as question answering (QA) applications. Large-scale knowledge bases store a vast amount of knowledge about different kinds of entities and enable systems to provide exact answers to entity-centric questions. Among these knowledge bases, curated KBs allow systems to reason over high-precision knowledge and return accurate answers.

Knowledge bases may be authored and curated by domain experts who need to come up with a domain-specific schema and a curation workflow to extract facts confirming to the schema. Even though highly precise, these KBs may be incomplete as they assume that the world's knowledge can be encoded using a closed vocabulary of predicates. Often the information missing from the KBs is present in the unstructured text from which the KBs are based.

For instance, a KB might contain information about public companies and some of their financial metrics, but may not contain relationships such as acquisitions, competitors, and subsidiaries that exist between the companies. This information, when available, can be curated from the text using information techniques to complete and complement the information missing from the KBs. This may help generalize the QA systems that suffer from the incompleteness of curated KBs. Domain experts may now ask questions to get automatically curated text and may use the insights from the answers provided by the system to further improve the curation workflow.

As an illustration, domain experts could build a KB containing precise financial metrics of public companies from the tables in the financial reports of these companies (e.g., 10-k reports). However, a query of interest to the user may look like:

"show me the revenue of company X's competitors in 2016."

This query cannot be supported solely by the curated KB and can be decomposed into two sub-queries:

(1) (?y, revenue of, ?x), and (2) (?x, "be competitors of", "company X"), where query (1) can be answered by the curated knowledge base once we know the answer to query (2), which can be found in the free-text of company X's financial reports (assuming the reports indeed contain the information of interest).

As a result, in one embodiment, heterogeneous data sources, the structured KB, and the unstructured text may be combined and used to build a dynamic hybrid knowledge base that benefits from the precision of a structured KB and the coverage of the facts from unstructured text. Given a natural language question, or an interpretation of the natural language question, the system can selectively query the unstructured text or the structured KB, extract and integrate information as needed, and integrate the results to answer the query as a whole.

Exemplary features include the following:

1. Given a local representation of a natural language query (NLQ), referred to as a logical query, a corresponding query plan is generated. The plan consists of query operators that query an existing knowledge base and unstructured data to generate intermediate results, combine the intermediate answers and aggregate the final results.

2. For query operators that access the unstructured data, relevant snippets related to the operator are retrieved from the unstructured data.

a. Facts from the relevant snippets are extracted and ranked.

b. Results for the input query operator are determined from the extracted facts.

3. For query operators that access the curated knowledge base, the knowledge base is queried to retrieve relevant facts.

4. The final results for the original query plan are produced.

One exemplary approach will query free text in an on-demand fashion to find missing information so that a query can be answered. This approach supports more queries when compared to static knowledge base approaches. Additionally, missing information is extracted from free text in an on-demand fashion. Further, the current approach decomposes complex queries into multiple sub-queries that can either be answered more reliably by the curated KB or by the extracted KB if the relevant information is missing from the curated KB.

Before answering any questions, the system needs a one-time pre-processing step. In an offline process, the system creates an inverted index over the free text corpora that allows for efficient keyword search at query time.

The system, in an offline process, creates an inverted index over the text corpora that allows for efficient keyword searches. Additionally, some metadata such as year, namespace, and entities associated with the text are indexed.

The input to the system is a logical query (e.g., one interpretation of a natural language question). A logical query is a conjunction of multiple clauses, where each clause is an n-ary tuple with one or more variable arguments. A physical plan generator interprets the logical query and generates a physical plan for the query. A physical plan determines the order of execution of the clauses and whether a clause needs to be executed against the curated KB or the free text. Additionally, a physical plan determines how the intermediate results are combined and optionally aggregated.

If a query clause needs to be executed against the free text, the query clause is first rewritten using metadata to generate more relaxed query plans. This helps retrieve text snippets that might not express the information of interest. Each of the relaxed query plans is then paraphrased to handle the numerous ways in which the same fact could be expressed in the free text. The query plans are ranked based on their semantic similarity to the original query. The top-k query plans are optimized, and common keyword queries are identified across query plans and are executed once.

A keyword query is issued against the indexed text corpus to retrieve relevant text snippets. An open-domain information extractor extracts triples (subject-predicate-object) of facts from the text snippets. Since these triples are noisy and not normalized, the system further processes and annotates them to help identify answers correctly. Triples across different query plans are aggregated and ranked based on their estimated reliability. The system then identifies answers from the triples using an alignment-based answer identification algorithm. These answers are further disambiguated and returned to the plan generator for further consumption.

If the query clause needs to be executed against the curated KB, it must first be translated to a query in a high-level declarative language. An ontology query language (OQL) may be used to access the information stored in the curated KB. Since query decomposition decomposes the query into multiple simple clauses, manually-crafted templates may be used to translate a clause to an OQL query. The information overlap of the schema elements between the logical query and OQL query may be used to select a template to query the curated KB. A selected template is instantiated and the corresponding OQL query is issued against the KB, which returns a set of tuples.

In one embodiment, heterogenous data sources include a structured KB, which has high-precision real world facts, and free text, which includes a large repository of sentences that complement facts in the KB. A hybrid system benefits from the precision of curated KBs and coverage of text-style facts, and helps domain experts identify predicates missing from the curated KBs.

Additionally, in one embodiment, keyword queries may be routed to a superset of relevant documents, and using metadata for query relaxation and rewriting. Additionally, a paraphrasing model may be used for query expansion.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a question in a natural language format;
deriving a plurality of subqueries from the question;
determining that a first subquery of the plurality of subqueries cannot be resolved utilizing a curated knowledge base, wherein the first subquery includes an incomplete subject/predicate/object triple;
resolving the first subquery, utilizing unstructured text including a textual corpus from which the curated knowledge base was created; and
adjusting the curated knowledge base, utilizing the resolved first subquery.

2. The computer-implemented method of claim 1, wherein the question is received by a question answering (QA) application.

3. The computer-implemented method of claim 1, wherein the subqueries are derived from the question by parsing the natural language format of the question into logical form.

4. The computer-implemented method of claim 1, wherein each subquery includes an incomplete subject/predicate/object triple.

5. The computer-implemented method of claim 1, wherein adjusting the curated knowledge base includes adding the resolved first subquery to the curated knowledge base.

6. The computer-implemented method of claim 1, wherein resolving the first subquery includes querying a search index previously created utilizing the unstructured text.

7. The computer-implemented method of claim 6, wherein query relaxation is used to create additional terms to include in a search index query.

8. The computer-implemented method of claim 6, wherein resolving the first subquery includes receiving results of querying the search index.

9. The computer-implemented method of claim 8, wherein resolving the first subquery includes creating new triples, utilizing results of querying the search index.

10. The computer-implemented method of claim 9, wherein resolving the first subquery includes completing the first subquery, utilizing the new triples.

11. The computer-implemented method of claim 1, further comprising resolving a second subquery of the plurality of subqueries by utilizing the adjusted curated knowledge base.

12. The computer-implemented method of claim 11, wherein the resolved first subquery and the resolved second subquery are used to create an answer to the received question.

13. The computer-implemented method of claim 1, wherein resolving the first subquery includes:
querying a keyword-based search engine created for the unstructured text, utilizing terms found within the incomplete triple of the first subquery;
receiving results of querying the keyword-based search engine, the results including portions of text that match the query;
ranking the results according to relevance to the query sent to the keyword-based search engine;
creating new complete subject/predicate/object triples, utilizing the results of querying the keyword-based search engine; and
completing the first subquery, utilizing the new complete subject/predicate/object triples;
wherein a search for additional unstructured data is performed in response to determining that a number of results of querying the keyword-based search engine falls below a predetermined threshold;

wherein adjusting the curated knowledge base includes adding the resolved first subquery to the curated knowledge base.

14. A computer program product comprising one or more computer readable storage media, and program instructions collectively stored on the one or more computer readable storage media, the program instructions comprising instructions configured to cause one or more processors to perform a method comprising:
receiving, by the one or more processors, a question in a natural language format;
deriving, by the one or more processors, a plurality of subqueries from the question;
determining, by the one or more processors, that a first subquery of the plurality of subqueries cannot be resolved utilizing a curated knowledge base, wherein the first subquery includes an incomplete subject/predicate/object triple;
resolving, by the one or more processors, the first subquery, utilizing unstructured text including a textual corpus from which the curated knowledge base was created; and
adjusting, by the processor, the curated knowledge base, utilizing the resolved first subquery.

15. The computer program product of claim 14, wherein the question is received by a question answering (QA) application.

16. The computer program product of claim 14, wherein the subqueries are derived from the question by parsing the natural language format of the question into logical form.

17. The computer program product of claim 14, wherein resolving the first subquery includes querying a search index previously created utilizing the unstructured text.

18. The computer program product of claim 17, wherein query relaxation is used to create additional terms to include in a search index query.

19. The computer program product of claim 17, wherein resolving the first subquery includes receiving results of querying the search index.

20. The computer program product of claim 17, wherein resolving the first subquery includes creating new triples, utilizing results of querying the search index.

21. The computer program product of claim 20, wherein resolving the first subquery includes completing the first subquery, utilizing the new triples.

22. The computer program product of claim 14, wherein:
each subquery includes an incomplete subject/predicate/object triple,
the curated knowledge base includes a plurality of complete subject/predicate/object triples, and
the first subquery of the plurality of subqueries includes an incomplete subject/predicate/object triple that cannot be completed by comparing the incomplete subject/predicate/object triple to the plurality of complete subject/predicate/object triples of the curated knowledge base.

23. The computer program product of claim 14, wherein resolving the first subquery includes:
querying a keyword-based search engine created for the unstructured text, utilizing terms found within the incomplete triple of the first subquery;
receiving results of querying the keyword-based search engine, the results including portions of text that match the query;
ranking the results according to relevance to the query sent to the keyword-based search engine;
creating new complete subject/predicate/object triples, utilizing the results of querying the keyword-based search engine; and
completing the first subquery, utilizing the new complete subject/predicate/object triples;
wherein a search for additional unstructured data is performed in response to determining that a number of results of querying the keyword-based search engine falls below a predetermined threshold;
wherein adjusting the curated knowledge base includes adding the resolved first subquery to the curated knowledge base.

24. A computer-implemented method comprising:
receiving a question in a natural language format;
deriving a plurality of subqueries from the question;
determining that a first subquery of the plurality of subqueries cannot be resolved utilizing a curated knowledge base;
resolving the first subquery, utilizing unstructured text including a textual corpus from which the curated knowledge base was created; and
adjusting the curated knowledge base, utilizing the resolved first subquery,
wherein each subquery includes an incomplete subject/predicate/object triple,
wherein the curated knowledge base includes a plurality of complete subject/predicate/object triples, and
wherein the first subquery of the plurality of subqueries includes an incomplete subject/predicate/object triple that cannot be completed by comparing the incomplete subject/predicate/object triple to the plurality of complete subject/predicate/object triples of the curated knowledge base.

25. A system, comprising:
a processor; and
logic integrated with the processor, executable by the processor, or integrated with and executable by the processor, the logic being configured to:
receive a question in a natural language format;
derive a plurality of subqueries from the question;
determine that a first subquery of the plurality of subqueries cannot be resolved utilizing a curated knowledge base, wherein the first subquery includes an incomplete subject/predicate/object triple;
resolve the first subquery, utilizing unstructured text including a textual corpus from which the curated knowledge base was created; and
adjust the curated knowledge base, utilizing the resolved first subquery.

26. The system of claim 25, wherein:
each subquery includes an incomplete subject/predicate/object triple,
the curated knowledge base includes a plurality of complete subject/predicate/object triples, and
the first subquery of the plurality of subqueries includes an incomplete subject/predicate/object triple that cannot be completed by comparing the incomplete subject/predicate/object triple to the plurality of complete subject/predicate/object triples of the curated knowledge base.

27. A computer-implemented method, comprising:
receiving a question in a natural language format;
deriving a first subquery and a second subquery from the question, the first subquery and the second subquery including incomplete subject/predicate/object triples;
determining that the incomplete subject/predicate/object triple of the first subquery cannot be completed by comparing the incomplete subject/predicate/object triple of the first subquery to a plurality of complete subject/predicate/object triples of a curated knowledge base created based on unstructured text;
creating additional search terms for the first subquery, utilizing query relaxation;
querying a keyword-based search engine created for the unstructured text, utilizing the first subquery and the additional search terms;
receiving search results of querying the keyword-based search engine, the results including portions of text that match the query;
creating new complete subject/predicate/object triples, based on the results of querying the keyword-based search engine;
completing the incomplete subject/predicate/object triple of the first subquery, utilizing the new complete subject/predicate/object triples;
updating the curated knowledge base to include the completed subject/predicate/object triple of the first subquery;
determining that the incomplete subject/predicate/object triple of the second subquery can be resolved utilizing the updated curated knowledge base; and
completing the second subquery, utilizing the updated curated knowledge base.

* * * * *